United States Patent
Marwah et al.

(10) Patent No.: US 12,511,487 B2
(45) Date of Patent: Dec. 30, 2025

(54) AUGMENTED QUESTION AND ANSWER (Q AND A) WITH LARGE LANGUAGE MODELS

(71) Applicant: MICRO FOCUS LLC, Santa Clara, CA (US)

(72) Inventors: Manish Marwah, Pleasanton, CA (US); Kristian Edward Ford, Littleton, CO (US); Martin Fraser Arlitt, Calgary (CA)

(73) Assignee: Micro Focus LLC, Santa Clara, CA (US)

( * ) Notice: Subject to any disclaimer, the term of this patent is extended or adjusted under 35 U.S.C. 154(b) by 144 days.

(21) Appl. No.: 18/226,303

(22) Filed: Jul. 26, 2023

(65) Prior Publication Data

US 2025/0036878 A1    Jan. 30, 2025

(51) Int. Cl.
*G06F 40/30*        (2020.01)

(52) U.S. Cl.
CPC .................... *G06F 40/30* (2020.01)

(58) Field of Classification Search
CPC .... G06F 16/3344; G06F 21/50; G06F 40/169; G06F 40/186; G06F 40/216; G06F 40/253; G06F 40/284; G06F 40/30; G06F 40/56; G06F 16/313; G06F 16/345; G06F 40/103; G06F 40/137; G06F 40/263; G06F 40/40; G06F 40/44; G06F 40/51; G06N 3/0475; G06N 3/0442; G06N 3/0499; H04L 41/5067; G06V 30/414
See application file for complete search history.

(56) References Cited

U.S. PATENT DOCUMENTS

| | | | | |
|---|---|---|---|---|
| 6,978,275 B2* | 12/2005 | Castellanos | ........... | G06F 16/345 707/999.102 |
| 7,856,350 B2* | 12/2010 | Zhou | ........... | G06F 40/30 707/738 |
| 8,938,384 B2* | 1/2015 | Goswami | ........... | G06F 40/263 704/8 |
| 9,830,314 B2* | 11/2017 | Byron | ........... | G06F 40/40 |
| 11,769,017 B1* | 9/2023 | Gray | ........... | G06F 40/56 704/9 |

(Continued)

OTHER PUBLICATIONS

Borgeaud et al. "Improving Language Models by Retrieving from Trillions of Tokens," Proceedings of the 39th International Conference on Machine Learning (PMLR 16), 2022, 35 pages.

(Continued)

*Primary Examiner* — Gerald Gauthier
(74) *Attorney, Agent, or Firm* — Sheridan Ross P.C.

(57) ABSTRACT

Large language models (LLMs) are versatile in responding to user questions on a wide variety of topics. However, LLMs suffer from several drawbacks, such as hallucinations, incomplete information, and inability to cite original sources of information. Disclosed herein are systems and methods for using an LLM in a restricted manner to respond to queries regarding document corpora, e.g., documents related to a set of products, such that the impact of these drawbacks is minimized. Information retrieval is coupled with LLMs to build a question and answer (Q&A) system on the text corpora. Complex retrieved information, incorporating human feedback, and recommendations in the Q&A system are provided.

20 Claims, 6 Drawing Sheets

(56) References Cited

U.S. PATENT DOCUMENTS

| | | | | |
|---|---|---|---|---|
| 11,947,912 | B1* | 4/2024 | Dong | G06F 40/284 |
| 12,299,404 | B2* | 5/2025 | Aberle | G06F 40/169 |
| 2007/0203707 | A1* | 8/2007 | Carus | G06F 40/103 |
| | | | | 704/270 |
| 2008/0040114 | A1* | 2/2008 | Zhou | G06F 40/30 |
| | | | | 704/257 |
| 2014/0136181 | A1* | 5/2014 | Ghosal | G06F 40/51 |
| | | | | 704/2 |
| 2016/0179775 | A1* | 6/2016 | Desai | G06F 40/284 |
| | | | | 707/739 |
| 2018/0232380 | A1* | 8/2018 | English | G06F 16/313 |
| 2020/0395001 | A1* | 12/2020 | Mohanty | G06F 16/3344 |
| 2022/0374405 | A1* | 11/2022 | Morrill | G06F 40/137 |
| 2023/0177267 | A1* | 6/2023 | Shorter | G06V 30/414 |
| | | | | 382/176 |
| 2023/0237277 | A1* | 7/2023 | Reza | G06F 40/186 |
| | | | | 704/9 |
| 2023/0259705 | A1* | 8/2023 | Tunstall-Pedoe | G06N 3/0499 |
| | | | | 704/9 |
| 2023/0274094 | A1* | 8/2023 | Tunstall-Pedoe | G06F 40/30 |
| | | | | 704/9 |
| 2023/0316006 | A1* | 10/2023 | Tunstall-Pedoe | G06N 3/0442 |
| | | | | 704/9 |
| 2024/0143932 | A1* | 5/2024 | Pandita | G06F 40/44 |
| 2024/0346255 | A1* | 10/2024 | Blohm | G06F 40/30 |
| 2024/0346256 | A1* | 10/2024 | Qin | G06F 40/216 |
| 2024/0386202 | A1* | 11/2024 | Hoffman | G06F 40/30 |
| 2024/0406081 | A1* | 12/2024 | Mermoud | H04L 41/5067 |
| 2024/0412029 | A1* | 12/2024 | Yang | G06N 3/0475 |
| 2024/0428007 | A1* | 12/2024 | Abdi | G06F 21/50 |
| 2024/0428783 | A1* | 12/2024 | Gupta | G06F 40/253 |
| 2025/0036878 | A1* | 1/2025 | Marwah | G06F 40/30 |

OTHER PUBLICATIONS

Devlin et al. "BERT: Pre-training of Deep Bidirectional Transformers for Language Understanding," arxiv.org, Oct. 11, 2018, arXiv: 1810.04805v1, 14 pages.

Guu et al. "Retrieval-Augmented Language Model Pre-Training," Proceedings of the 37th International Conference on Machine Learning (PMLR 119), 2020, 10 pages.

Lewis et al. "Retrieval-Augmented Generation for Knowledge-Intensive NLP Tasks," Proceedings of the 34th International Conference on Neural Information Processing Systems (NIPS'20), Dec. 2020, Article 793, 16 pages.

Reimers et al. "Sentence—BERT: Sentence Embeddings using Siamese BERT—Networks," arxiv.org, Aug. 27, 2019, arXiv: 1908.10084v1, 11 pages.

* cited by examiner

AUGMENTED QUESTION AND ANSWER (Q AND A) WITH LARGE LANGUAGE MODELS

FIELD OF THE DISCLOSURE

The invention relates generally to systems and methods for executing a query on a large language model and particularly to obtaining a result from the large language model that identifies a source of the result.

BACKGROUND

Retrieval-based augmentation of large language models (LLMs) is discussed in documents, including the following, each of which are incorporated herein by reference:
[RAG NeurIPS 2020] Lewis, Patrick, et al. "Retrieval-Augmented Generation for Knowledge-Intensive NLP Tasks." Advances in Neural Information Processing Systems 33 (2020): 9459-9474 (herein, "RAG [1]");
[REALM ICML 2020] Guu, Kelvin, et al. "Retrieval-Augmented Language Model Pre-Training." International Conference on Machine Learning. PMLR, 2020 (herein, "REALM [2]");
[RETRO ICML 2022] Borgeaud, Sebastian, et al. "Improving Language Models by Retrieving from Trillions of Tokens." International Conference on Machine Learning. PMLR, 2022 (herein, "RETRO [3]");
Devlin, Jacob, et al. "BERT: Pre-training of Deep Bidirectional Transformers for Language Understanding." arXiv preprint arXiv:1810.04805 (2018); and
Reimers, Nils, and Iryna Gurevych. "Sentence-BERT: Sentence Embeddings using Siamese BERT-Networks." arXiv preprint arXiv:1908.10084 (2019).

SUMMARY

Despite the advances of the prior art, challenges remain. The challenges include retrieval-based augmentation such as length of retrieved content, handling of complex table and visual data, incorporating human feedback, and going beyond answering questions by providing recommendations.

These and other needs are addressed by the various embodiments and configurations of the present invention. The present invention can provide a number of advantages depending on the particular configuration. These and other advantages will be apparent from the disclosure of the invention(s) contained herein.

Large language models (LLMs) have rapidly gained popularity for performing a large number of tasks, such as answering questions, providing translations, converting natural language specifications to computer code, etc. LLMs have become large stores of information that can be queried in natural language, are good at following instructions in user-provided prompts, and in responding in one or more of multiple styles and formats. The "world knowledge" possessed by an LLM is stored in the weights maintained in the LLM's neural network architecture, which may number in the billions.

However, the mechanism of storage, that is, where and how a particular fact is stored in the weights, and the level of memorization, that is, the extent to which an LLM can recall the facts seen in the training data, is not understood. The quality of storage of facts is also uncertain, that is, in some cases the stored facts are accurate while other "facts" comprise errors. These factual errors are known as hallucinations. Furthermore, since the facts are stored in the weights of the network, there is no easy way to provide a citation for the output generated by an LLM. LLMs are trained on a finite amount of text corpora (even though the volume of the corpora may be massive), and thus LLMs are unable to provide answers to questions on documents not present in the training data. These could include private documents that are unavailable to the LLM as training data, or documents produced after the date of collection of the training data set (typically referred to as the information cut-off date of the model).

Another disadvantage of directly using LLMs is that if any information changes, e.g., a document is updated, the LLM has to be trained or fine-tuned on the new document. In the proposed method, training or fine-tuning of LLM, which can be expensive, is not required. For embodiments herein, the only change necessary is the computation of new embeddings for the changed documents.

Embodiments herein are directed to address some or all of the above limitations and include retrieval-based augmentation of LLM, wherein information retrieval methods are used to provide the knowledge required to answer a question in a form of raw text in the prompt to an LLM. However, including some of this information as raw text presents challenges. For example, if the related document contains tables, figures (images), or videos, it can be difficult to incorporate as text in the prompt of an LLM. Accordingly, embodiments herein are further directed to retrieval-based augmentation of an LLM question and answer (Q&A) system on a specific set of text corpora in natural language. The embodiments generally address how augmentation is performed, including: 1) How complex input such as tables, images, and videos can be included; 2) How feedback from experts can be considered; 3) How feedback from users of the Q&A system can be included; and 4) How, based on the user query, the Q&A system can provide recommendations, e.g., of related products emphasizing their benefits to the user based on the user query.

In some aspects, the techniques described herein relate to a method including: receiving a query from a user device; mapping the query to a latent semantic embedding space, modeling a number of document segments of a number of documents, wherein each of the number of document segments includes document content, and wherein a distance between any two of the number of document segments in the latent semantic embedding space is proportional to a degree of similarity between the document content thereof; generating a prompt including the query and a set of nearest document segments in the latent semantic embedding space matching the query; submitting the prompt to a large language model (LLM) and receiving a response therefrom, wherein the response includes an answer to the query and indicia of a document segment of the number of document segments including document content matching the answer; and providing the response to the user device.

In some aspects, the techniques described herein relate to a method, further including formatting the response wherein the indicia of the document segment of the number of document segments including the document content matching the answer, includes indicia of one of the number of documents including the document content matching the answer.

In some aspects, the techniques described herein relate to a method, further including: accessing document corpus having the number of documents; segmenting each document of the number of documents into the number of document segments, each document segment including the document content; and plotting each of the number of document segments into the latent semantic embedding space.

In some aspects, the techniques described herein relate to a method, wherein segmenting each document of the number of documents into the number of document segments includes, for at least one document of the number of documents, segmenting at formatting breakpoints of the document content.

In some aspects, the techniques described herein relate to a method, wherein segmenting each document of the number of documents into the number of document segments includes: segmenting at topic breakpoints within the document content.

In some aspects, the techniques described herein relate to a method, wherein determining the topic breakpoints within the document content includes: segmenting the document content into a first number of segments; computing a number of tokens for each of the first number of segments, wherein each token of the number of tokens represents a single word of the document content; accessing a context size of the LLM; estimating a high threshold number of tokens from the context size of the LLM; tokenizing the document content of a segment into a number of tokens; and upon determining the number of tokens is greater than the high threshold number of tokens, resegmenting the document content into a second number of segments that is greater than the first number of segments.

In some aspects, the techniques described herein relate to a method, wherein determining the topic breakpoints within the document content includes: segmenting the document content into a first number of segments; computing a number of tokens for each of the first number of segments, wherein each token of the number of tokens represents a single word of the document content; accessing a context size of the LLM; estimating a low threshold number of tokens from the context size of the LLM; tokenizing the document content of a segment into a number of tokens; and upon determining the number of tokens is less than the low threshold number of tokens, resegmenting the document content into a second number of segments that is less than the first number of segments.

In some aspects, the techniques described herein relate to a method, wherein: the document content of at least one document of the number of documents includes table data, the table data comprising a number of cells having a cell value, the cell value being further associated with at least one of a column heading, a row heading, and/or a table heading of the table data; and segmenting the table data into at least one of the number of document segments includes: linearizing the table data to include a linearized cell value including the cell value, the column, and the heading; and segmenting at topic breakpoints between topics of the linearized table data.

In some aspects, the techniques described herein relate to a method, wherein: the document content of at least one document of the number of documents includes visual data; and the method further includes extracting at least one textual description from metadata of the at least one document and segmenting the number of document segments of the at least one textual description.

In some aspects, the techniques described herein relate to a method, wherein: the document content of at least one document of the number of documents includes visual data, the visual data further including a number of video frames; and the method further includes extracting at least one textual description from metadata of the at least one of the number of video frames and segmenting the number of document segments of the at least one textual description.

In some aspects, the techniques described herein relate to a method, wherein the metadata includes digital images of text.

In some aspects, the techniques described herein relate to a system, including: a server, including at least one microprocessor coupled to a computer memory storing machine-readable instructions therein; the instructions causing the server to perform: receiving a query from a user device; mapping the query to a latent semantic embedding space, modeling a number of document segments of a number of documents, wherein each of the number of document segments includes document content, and wherein a distance between any two of the number of document segments in the latent semantic embedding space is proportional to a degree of similarity between the document content thereof; generating a prompt including the query and a set of nearest document segments in the latent semantic embedding space matching the query; submitting the prompt to a large language model (LLM) and receiving a response therefrom, wherein the response includes an answer to the query and indicia of a document segment of the number of document segments including document content matching the answer; and providing the response to the user device.

In some aspects, the techniques described herein relate to a system, further including formatting the response, wherein the indicia of the document segment of the number of document segments including the document content matching the answer, includes indicia of one of the number of documents including the document content matching the answer.

In some aspects, the techniques described herein relate to a system, further including: accessing a document corpus having the number of documents; segmenting each document of the number of documents into the number of document segments, each document segment including the document content; and plotting each of the number of document segments into the latent semantic embedding space.

In some aspects, the techniques described herein relate to a system, wherein segmenting each document of the number of documents into the number of document segments includes, for at least one document of the number of documents, segmenting at formatting breakpoints of the document content.

In some aspects, the techniques described herein relate to a system, wherein segmenting each document of the number of documents into the number of document segments includes: segmenting at topic breakpoints within the document content; determining the topic breakpoints within the document content, further including: segmenting the document content into a first number of segments; computing a number of tokens for each of the first number of segments, wherein each token of the number of tokens represents a single word of the document content; accessing a context size of the LLM; estimating a high threshold number of tokens from the context size of the LLM; tokenizing the document content of a segment into a number of tokens; and upon determining the number of tokens is greater than the high threshold number of tokens, resegmenting the document content into a second number of segments that is greater than the first number of segments.

In some aspects, the techniques described herein relate to a system, wherein determining the topic breakpoints within the document content includes: segmenting the document content into a first number of segments; computing a number of tokens for each of the first number of segments, wherein each token of the number of tokens represents a single word of the document content; accessing a context size of the LLM; estimating a low threshold number of tokens from the context size of the LLM; tokenizing the document content of a segment into a number of tokens; and upon determining the number of tokens is less than the low threshold number of tokens, resegmenting the document content into a second number of segments that is less than the first number of segments.

In some aspects, the techniques described herein relate to a system, wherein: the document content of at least one document of the number of documents includes table data, the table data comparing a number of cells having a cell value, the cell value being further associated with a column and a heading of the table data; and segmenting the table data into at least one of the number of document segments includes: linearizing the table data to include a linearized cell value including the cell value, the column, and the heading; and segmenting at the topic breakpoints between topics of the linearized table data.

In some aspects, the techniques described herein relate to a system, wherein: the document content of at least one document of the number of documents includes visual data; and the instructions further causing the server to perform extracting at least one textual description from metadata of the at least one document and textual description from metadata of the at least one of the number of video frames and segmenting the number of document segments of the at least one textual description.

In some aspects, the techniques described herein relate to a system, including: a server, including at least one microprocessor coupled to a computer memory storing machine-readable instructions therein; and a data storage including a latent semantic embedding space, modeling a number of document segments of a number of documents; and wherein the instructions cause the server to perform: receiving a query from a user device; mapping the query to the latent semantic embedding space, modeling a number of document segments of a number of documents, wherein each of the number of document segments includes document content, and wherein a distance between any two of the number of document segments in the latent semantic embedding space is proportional to a degree of similarity between the document content thereof; generating a prompt including the query and a set of nearest document segments in the latent semantic embedding space matching the query; submitting the prompt to a large language model (LLM) and receiving a response therefrom, wherein the response includes an answer to the query and indicia of a document segment of the number of document segments including document content matching the answer; and providing the response to the user device.

A system on a chip (SoC) including any one or more of the above aspects or aspects of the embodiments described herein.

One or more means for performing any one or more of the above aspects or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

Embodiments described herein may utilize artificial intelligence (AI), such as neural networks. Neural networks are a type of machine learning model inspired by the structure and function of the human brain. They are composed of interconnected nodes, called neurons, organized in layers. Each neuron receives input signals, performs a computation, and produces an output signal.

Input Layer: The neural network begins with an input layer that receives the initial data, such as images, text, or numerical values. Each input is represented as a numeric feature.

Hidden Layers: Between the input and output layers, there can be one or more hidden layers. Each hidden layer consists of multiple neurons that process the input from the previous layer. These layers help to extract and learn complex patterns and relationships within the data.

Weights and Activation Functions: Each connection between neurons in different layers is associated with a weight. The weights determine the strength or importance of the input. The input signals are multiplied by their corresponding weights, and the results are summed up.

After the summation, an activation function is applied to introduce non-linearity into the model. Common activation functions include the sigmoid function, tanh function, Rectified Linear Unit (ReLU) function, and Gaussian Error Linear Units (GELUs).

Output Layer: The final hidden layer is connected to the output layer, which produces the final output of the neural network. The number of neurons in the output layer depends on the problem type. For example, a neural network used for image classification may have neurons representing different classes. A neural network used for a language model may have neurons representing different tokens in the vocabulary.

Tokens (i.e., the results from performing tokenization) result from a text input. The text is input to an LLM, or any other ML model, and tokenized, that is, split into numbers called token ids or simply tokens. A token can correspond to a character, a subword, a word or even a group of words. There are different tokenization strategies resulting in different trade-offs in terms of computation required and the amount of text that would fit in a context of an LLM. The most commonly used tokenization method is called byte pair encoding (BPE), which performs sub-word level tokenization. As an example, the text, "this is an example of tokenization" (without quotes) may be tokenized, such as the word "this" is tokenized to "1212". Similarly, "is" is tokenized to "318", "an" is tokenized to "281", "example" is tokenized to "1672", "of" is tokenized to "286", "tokenized" is split into two parts wherein "token" is tokenized to "11241", and "ization" is tokenized to "1634" (quotation are provided in the foregoing example solely for readability and are not part of the text or resulting token). The specific tokenization utilized may be specific to a tokenization model and may differ between models.

Forward Propagation: The process of feeding input data through the neural network to produce an output is called forward propagation. During this step, the input signal is propagated through the layers, with the weighted sums and activation functions applied at each neuron, until it reaches the output layer.

Loss Calculation: The output generated by the neural network is compared to the desired or target output. A loss function is used to measure the error or mismatch between the predicted and target outputs. The choice of the loss function depends on the problem being solved.

Backpropagation: After the loss is calculated, the network adjusts its weights and biases to minimize the loss. This is done through a process called backpropagation. The gradients of the loss with respect to the weights are computed and used to update the weights using optimization algorithms like gradient descent. This step helps the network learn by iteratively adjusting the weights to improve the accuracy of the predictions.

Training and Iteration: The process of feeding the training data, calculating the loss, and updating the weights through backpropagation is repeated iteratively. The goal is to minimize the loss on the training data, allowing the network to generalize and make accurate predictions on new, unseen data.

Prediction: Once the neural network has been trained, it can be used to make predictions on new input data. The forward propagation process is applied to the new data, and the network generates the output based on the learned patterns and relationships.

Neural networks may have various architectures and configurations, such as convolutional neural networks (CNNs) for image processing or recurrent neural networks (RNNs) or transformer architecture for sequential data.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 212(f) and/or Section 212, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

A neural network, as is known in the art and in one embodiment, self-configures layers of logical nodes having an input and an output. If an output is below a self-determined threshold level, the output is omitted (i.e., the inputs are within the inactive response portion of a scale and provide no output). If the self-determined threshold level is above the threshold, an output is provided (i.e., the inputs are within the active response portion of a scale and provide an output). The particular placement of the active and inactive delineation is provided as a training step or steps. Multiple inputs into a node produce a multi-dimensional plane (e.g., hyperplane) to delineate a combination of inputs that are active or inactive.

Figure 1:
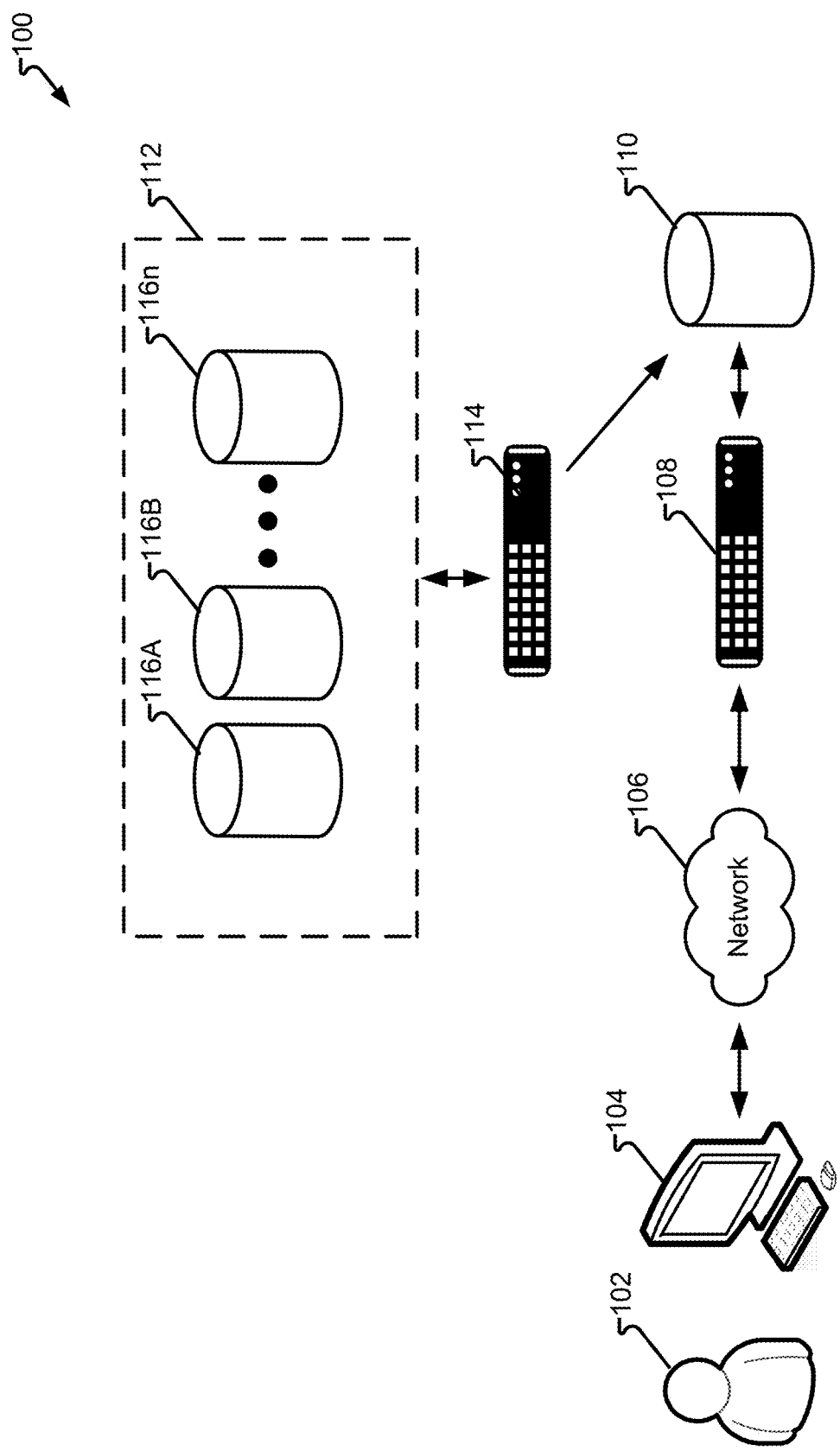
FIG. 1 depicts a system in accordance with embodiments of the present disclosure.

FIG. 1 depicts system 100 in accordance with embodiments of the present disclosure. In one embodiment, user 102 utilizes computer 104 to conduct an interactive question and answer (Q&A) with server 108. Computer 104 comprises a network interface to communicate with server 108 via network 106. Computer 104 may receive a question from user 102 via network 106 and, in response to the question, query server 108 and receive an answer therefrom. Server 108 may formulate the answer from, at least in part, data maintained in data storage 110. It should be appreciated by those of ordinary skill in the art that the topology and components depicted in system 100 are one embodiment. In other embodiments, network 106 or another network may interconnect additional components (e.g., repositories 116A-116n, server 114, server 108, and/or data storage 110). Similarly, while server 108, data storage 110, server 114 are depicted in system 100 as single devices and repositories 116A-116n depicted as three devices, other topologies and component configurations may be utilized without departing from the scope of the embodiments herein. For example, component configurations may combine, separate, or share hardware resources with other components.

In order to enable server 108 to be able to utilize data storage 110, data storage 110 must be configured with data usable to server 108. As will be discussed in more detail with respect to certain embodiments that follow, document corpora 112 may be embodied as text only data and, additionally or alternatively, other forms of documents. It should be appreciated that the term "document," as used herein, is variously embodied. Embodiments of documents are computer-accessible data sources that include, but are not limited to, books, scholarly papers, publications, periodicals, journals, websites, images, audio/video files, application documents (e.g., spreadsheets, presentations, word processing document files, etc.) or other information-maintaining form.

Document corpora 112 may be specific to a particular subject matter, such as all the documentation related to a particular product of a business or a single field of study, or may be more general, such as all documents of a company up to and including all publicly available documents on the internet. Document corpora 112 is accessed by server 114 at least once and, optionally, subsequently accessed, such as to capture and process subsequent updates that have occurred to document corpora 112.

User 102, in response to a question, may receive an answer from server 108 having access to data storage 110. The answer generated by server 108 may be formulated as conversational text, or optionally encoded as audio and delivered as generated speech. The answer may additionally comprise identification of at least one source that was relied upon by server 108 to generate the answer. As a benefit, user 102 may be provided with an answer and the source in order to determine the likelihood that the answer is or is not correct, verify the provided answer against the answer's source, or access the source to obtain additional information. For example, user 102 may ask a medical question and data storage 110 may contain data segments from a very large and diverse set of sources (e.g., the internet). Server 108 may generate an answer to the medical question and include at least one source used to generate the answer. If the source has a high level of information provided by experts or other qualified sources (e.g., a resource of a national medical institution or a well-respected teaching hospital, etc.), user 102 may be more likely to consider the answer generated by server 108 as accurate or may be better able to verify accuracy.

Figure 2:
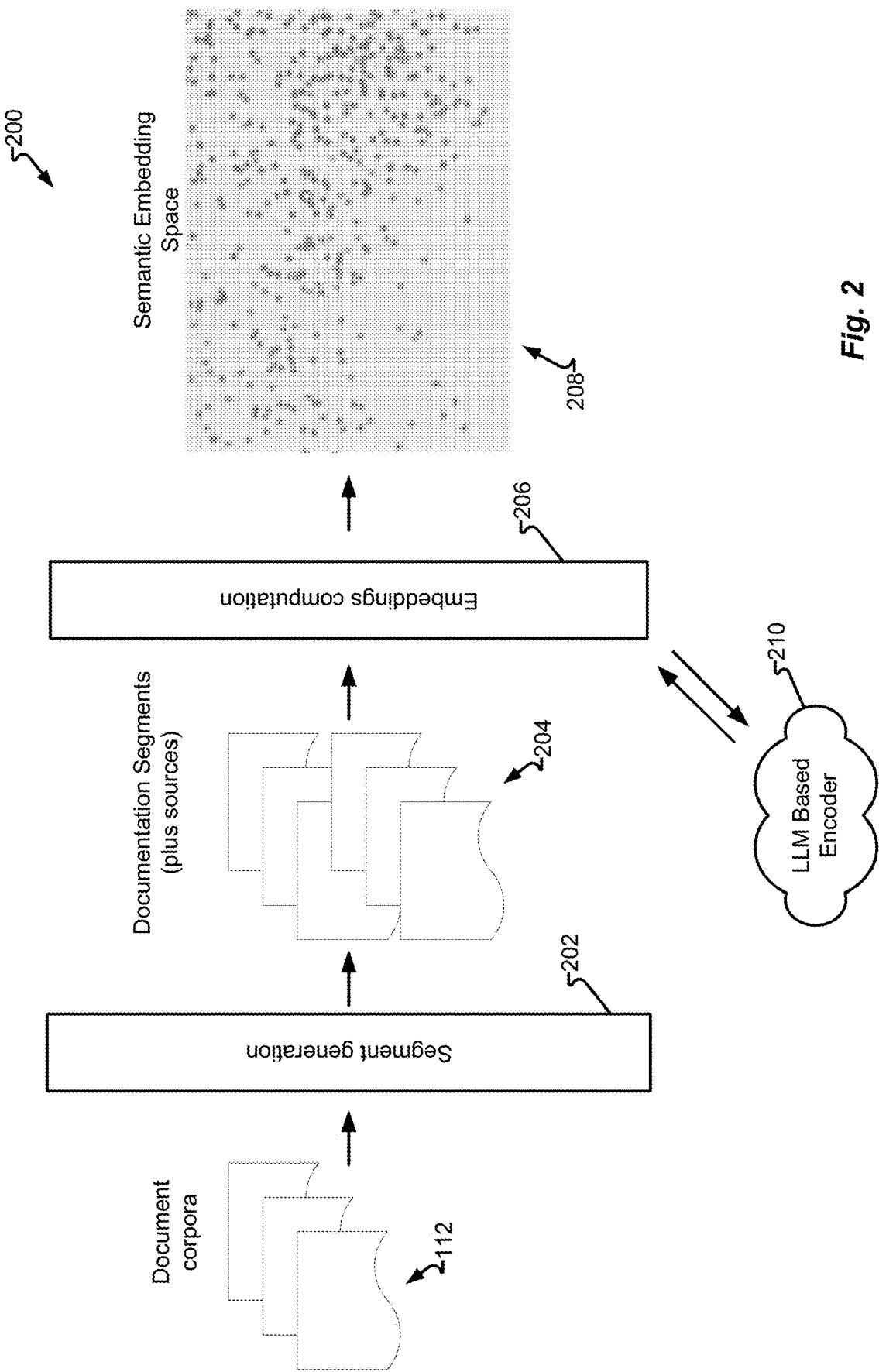
FIG. 2 depicts a data flow in accordance with embodiments of the present disclosure.

FIG. 2 depicts data flow 200 in accordance with embodiments of the present disclosure. In one embodiment, segment generation 202 accesses document corpora 112 and produces documentation segments with corresponding sources 204. Segment generation 202 accesses document corpora 112 such as via web scraping, dataset construction, or other document acquisition means. Document acquisition portion of corresponding sources 204 may optionally exclude portions of document corpora 112 that are known to be incorrect or irrelevant to a specified subject matter. Once accessed, segment generation 202 generates data segments while maintaining source information; segment generation 202 need only be performed once.

In another embodiment, data segmentation is performed by segment generation 202. Generally, data accessed is split into a logical set of sections, transforming non-textual elements, and finally each section is embedded into a memory space, such as latent semantic embedding space 208. It should be noted that the terms "segment" and "and section" as used herein may be used interchangeably. The memory space comprises a number of points, herein representing segments, wherein each point comprises a location data element (e.g., a coordinate, distance from a reference point, etc.) within the memory space and/or relative to other points. Latent semantic embedding space 208 may be maintained by a data storage, such as data storage 110 for access by server 108. Latent semantic embedding space 208 is illustrated as a two-dimensional grid; however, in other embodiments and in practice, there may be many more dimensions wherein proximity (as represented by a data structure comprising location of the points within latent semantic embedding space 208) in at least one dimension indicates the degree of relation between two sections extracted from one or more documents. Sufficiently proximate points indicate similarity. Accordingly, segments that are similar in topic will be grouped more closely, as represented by the points in the memory space, as compared to segments that are less similar in topic. The dimension(s) may be determined based on a corresponding topic(s) maintained in the LLM. Generally, the each dimension will be the same. Computation 206 needs to be performed only once. The distance between points is proportional to the distances between all points for a topic and the degree of similarity of the associated segment and document. Points may be close (e.g., closer than a mean distance between all points) in one dimension, such as for one topic, but far apart (e.g., farther than the mean distance between all points) in another dimension (e.g., a second topic). Points are plotted into latent semantic embedding space 208, such as by creating a data record of the point, and a corresponding segment and/or document, and a location within latent semantic embedding space 208.

The creation, and subsequent use, of the data segments generally allows for a more granular identification of information and the identification of relationships, and degree of relationship, between segments as well as the identification and removal or aggregation of duplicates.

Individual documents from document corpora 112 are split into segments that depend, at least in part, on the context size of the LLM being used. The context size of an LLM determines how far back dependency relationships are captured in a sequence. A typical maximum context sizes ranges from 4,000 to 32,000 tokens, which may be defined by the LLM and wherein each token is a computerized representation (e.g., numerical value(s)) used to represent a collection of words, a single word, or a sub-word portion (e.g., a word stem, prefix, suffix, etc.). A tokenization process, such as byte pair encoding, is performed utilizing LLM based encoder 210, and to determine the particular token value. Embedded tokenization 206 encodes document segments into embeddings, that is, vectors in the latent semantic space. The input to embedded tokenization 206 are document segments; the output is vectors of some dimensionality, for example 1500. Embedded tokenization 206 uses the LLM-based encoder 210 for computing the embeddings. Embedded tokenization 206 performs pre-processing and prepares segments received from segment generation 202 for sending to 210, sends the segments to LLM based encoder 210, receives the vectors corresponding to the segments back from LLM based encoder 210, and saves those vectors for future use. The context size may be dynamically determined to balance computational and memory demands with the granularity of the segments.

In one embodiment, each section of a document will represent a topic. A document's section may be delineated by format (e.g., section, chapter, paragraph, sentence, etc.) or by the content itself. For example, segment generation 202 may comprise semantic language analysis of a document of document corpora 112 and may be used to determine that a first topic is being discussed in a document and then may transition to a second topic. The transition may then be used to delineate the first topic from the second topic.

In another embodiment, a topic could be split into several segments; or multiple topics can be present in one segment. Further, multiple segments, in different parts of a document or in different documents, may contain the same or very similar topic.

A section's size is dynamically determined. If too short, the embedding computed for the section that is performed later in the pre-processing step may not be representative of the section content. If too long, then accurately computing the embedded source is more resource intensive and/or error prone. Additionally, if too large, a section may not fit into the context of an LLM. The number of sections that can fit in the LLM context determines the number of sections that can be used by the LLM to synthesize a response. Thus, document corpora 112 needs to be split such that several sections can fit within the context.

Once a section is identified, a number of tokens are determined for each segment. As introduced above, a token represents a word or word stem. Based on the context size of the LLM, a lower threshold and upper threshold is estimated in terms of tokens for the segments. For example, to answer a question, it is assumed that five segments and, based on an average number of tokens per segment, a number of tokens, is determined. Additionally or alternatively, the calculated number of tokens may be padded with a margin of additional tokens.

Segments with fewer tokens than the lower threshold are identified as too short, while those with tokens greater than the upper threshold are identified as too long. Advantages are obtained by minimizing the number of short segments and eliminating all long segments.

The determination that the segments are too short causes embedding computation 206 to combine segments with fewer tokens than the lower threshold with other semantically similar sections. There are various ways to achieve this. In one embodiment, utilizing LLM based encoder 210 computes an embedding for all the segments in order to compare them, which may be a discrete step or combined with embedding sources into the segments. For each segment considered to be short, embedding computation 206 finds the corresponding k-nearest neighbors and checks, starting with the closest match, if the short segment can be combined with the nearest neighbor and, if so, creates a new segment without exceeding the upper threshold. The closest match may be determined by sequentially finding the k-nearest neighbors of each short segment. Each segment is already converted to an embedded vector (e.g., of size "p"). Distance between segments can be estimated by computing cosine similarity between the corresponding vectors. If the number of segments is large, approximate k-nearest neighbor methods can be used.

It should be appreciated that other means to determine relationships between segments and the degree of such a relationship may be utilized in addition or as an alternative to k-nearest neighbor. As long as this condition holds, the segments are merged. This process is repeated until no short segments remain, or no match can be found for a short segment.

While embedding computation 206 may contain the functionality to adjust segment sizes, this functionality may be in segment generation 202 and taken into account during the initial segmentation, and if needed one or multiple rounds of re-segmentation are performed so that the segments produced by segment generation 202 satisfy the conditions of no long segments and minimal short segments. The functionality could also be distributed between both computation 206 and segment generation 202, especially in cases where the embeddings are used to determine similarity to say merge shorter segments (once any segments are merged or split their embeddings may be recomputed).

When embedding computation 206 and/or segment generation 202 determines that the segments are longer than the upper threshold, the segments are split further into multiple segments, or alternatively, simply truncated. If there are sub-sections available within the segments, embedding computation 206 uses the sub-sections as formatting breakpoints to determine splits in the segments until all the resulting segments are less than the upper threshold. If no sub-sections are marked, embedding computation 206 locates natural breakpoints, such as topic breakpoints to identify changes in topic, to split using text segmentation methods. In one embodiment, an LLM could be used to produce a shorter, summarized version of the segment. In particular, the prompt provided to the LLM to summarize the segment can include an approximate length based on the upper threshold. While there is some loss of information, depending on the LLM, the shortened document has the advantage that the number of segments does not increase.

Based on the extracted segments, a data set is created with the following fields: 1) Parent document name of the segment; 2) Unique segment name—e.g., this could be constructed from the document hierarchy leading to the section used to create the segment, that is, document name, chapter name, or one or more section names, starting page, or other unique identifier; 3) Segment reference—e.g., this could be a hyperlink or a document name and page number combination, which can act as a source reference for the segment content; 4) Segment content; and 5) Segment token length.

Non-text: LLMs typically only accept text, so improperly formatted tables, images, and videos (e.g., in online documents) result in lost information. Accordingly, certain embodiments herein are directed to capturing non-textual data and non-textual aspects of textual data (e.g., text as graphics, text in a location having a meaning such as in a table, etc.).

Tables: When tables are extracted from documents as text, the formatting may not be preserved, and the markers between rows and columns may not be accurate. To fix this, a description of a table can be provided. For example, each cell can be described by computation 206 in terms of the contents of the cell and the corresponding row and column headings. Another way to specify a table is to "linearize" it, similar to a matrix. Linearization may be based on a row-major or a column-major format; in the former, the entries of a row will be together with the column information specified for each cell; in the latter, the entries of a column will be together with the row information specified for each cell. The choice between these two formats can be determined by the actual number of rows and columns in the table, and/or through feedback.

Images: Images typically have a caption; however, it is not sufficient to fully describe the figure or image. Computation 206 may then include the image caption and/or generate and include a description of the image using a machine learning model. Where available, any alternate text provided with an image is included. In addition to the reference for a segment, a specific reference for an image can also be created and a hyperlink provided so that if it is relevant, the LLM could include the image hyperlink in a response for a user, so they can use the link to look at the image if they desire.

Videos: Videos are files comprising visual data (e.g., images, frames of images) and may optionally comprise an audio portion. The audio portion may be transcribed (using trained machine learning models) into text and included in a segment. The video can be broken into images, and ideally subsampled, to reduce the number of frames, and then treated like images above. Another method to reduce the number of frames is to use one of the methods for video summarization, and then use its frames. Similar to the case of images, a specific reference of a video can be created and included in the segment. Video files (and similarly images, audio, and other data files) may comprise metadata (e.g., a file name, embedded descriptions, attributes, dates, etc.) for the entirety of the file or, for video files, for a number of frames of the video. Such metadata may be utilized to obtain a description to be used alone and/or with other descriptive information. Improving the metadata associated with tables, images and videos is another way that the documentation creation tools/programs can be extended.

Embed segments: In the last part of the pre-processing, computation 206 creates an embedding for the content of each of the segments. A transformer-based encoder model such as BERT [4], sentence transformer [5], OpenAI models available via an API, etc., may be utilized for this purpose. These embeddings are dense vectors (e.g., size 1,500) that capture the semantics of the content.

As a result, latent semantic embedding space 208 is populated and able to be used to determine answers to questions. It should be appreciated that the latent semantic embedding space 208 is illustrated as a 2-D approximation of the memory space (which could be say 1500-dimensional).

Figure 3:
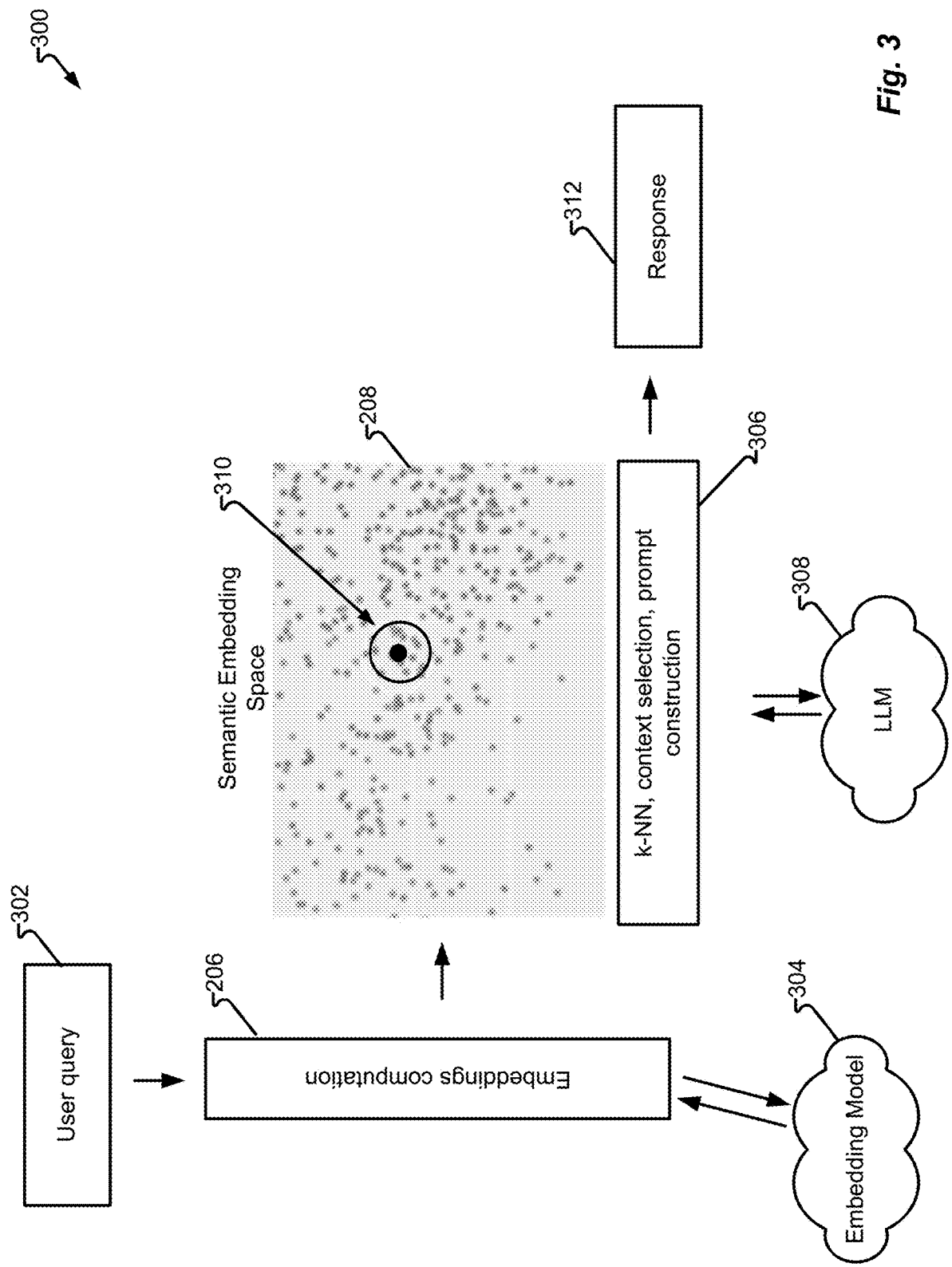
FIG. 3 depicts a data flow in accordance with embodiments of the present disclosure.

FIG. 3 depicts data flow 300 in accordance with embodiments of the present disclosure. Data flow 300 is executed after at least one execution of data flow 200 (see FIG. 2) and for each query initiated by user 102. User 102 executes user query 302, such as via inputs to computer 104, which are then received by server 108 having access to latent semantic embedding space 208 maintained on data storage 110. Computation 206 is performed by server 108 using embedding model 304. Computation 206 maps the user query onto latent semantic embedding space 208 to find a result, such as by using the k-nearest neighbor in order to find nearest segment 310 and, as a result, mapping to the document segments and to the originating document.

Next, prompt construction 306 generates a prompt to comprise the most relevant segments identified as those segment(s) within nearest segment 310 and user query 302. LLM 308 is then provided with the prompt which then generates response 312 for presentation to user 102 via computer 104. LLM 308 may be executed on a "cloud" computing platform or hosted on one or more local machines. LLM 308 may be pre-trained for a particular set of subjects or be unbound by the subject. Optionally, a response modifier may be included in the prompt, such to cause the style or manner of response 312 to be altered (e.g., instructional, informational, brief, verbose, conversational, include/exclude ancillary actions or recommendations, language, etc.).

Response 312 is generated to include indicia of the source document determined by LLM 308 as providing or confirming the correctness of the answer provided in response 312. For example, if LLM 308 is provided with several segments for documents that are all in agreement as to a particular answer, then indicia of one or more of those documents may be identified as a portion of response 312. Similarly, if a single segment provides an answer, then indicia of the segment's document is provided in response 312. Indicia may include a title or other human-friendly description of the document(s) providing/confirming the answer and/or a machine-friendly identifier, such as a URL or other location identifier of the document.

In another embodiment, the level of confidence may be indeterminate or below a previously determined threshold. For example, if nearest segment 310 has segments that are not close enough, such as the k-nearest neighbor is likely to include irrelevant information or LLM or a low-confidence result from LLM 308, prompt construction 306 may then modify response 312. The modification to response 312 may be to simply state, "I don't know," "I don't have the information to answer that question," or to provide the answer but include additional content added to response 312, such as to indicate the confidence of the correctness of the answer is low.

In another embodiment, segments and their position in latent semantic embedding space 208 may be modified based on feedback received from prior results (e.g., one or more of response 312). Feedback may be explicitly provided, such as user 102 indicating the correctness of a particular response 312 for a prior query (e.g., user query 302). Based on such feedback, the distance may be altered to cause the same segment(s) to be selected more often for a similar query, when the prior query feedback indicates correctness, or be excluded or selected less often when the prior query feedback indicates incorrectness, irrelevance, or anything other than correctness. Feedback may be automated, such as to determine if a substantially similar second query (e.g., one of user query 302) is submitted after first obtaining a prior result (e.g., a prior response 312) and thereby indicating that the first user query 302 did not produce an accurate or useful response 312. Similarly, if no subsequent user query 302, or a subsequent user query 302 that is unrelated to a first user query 302, follows from a prior response 312, then the result of the prior response 312 may be determined to be correct and/or useful.

Figure 4:
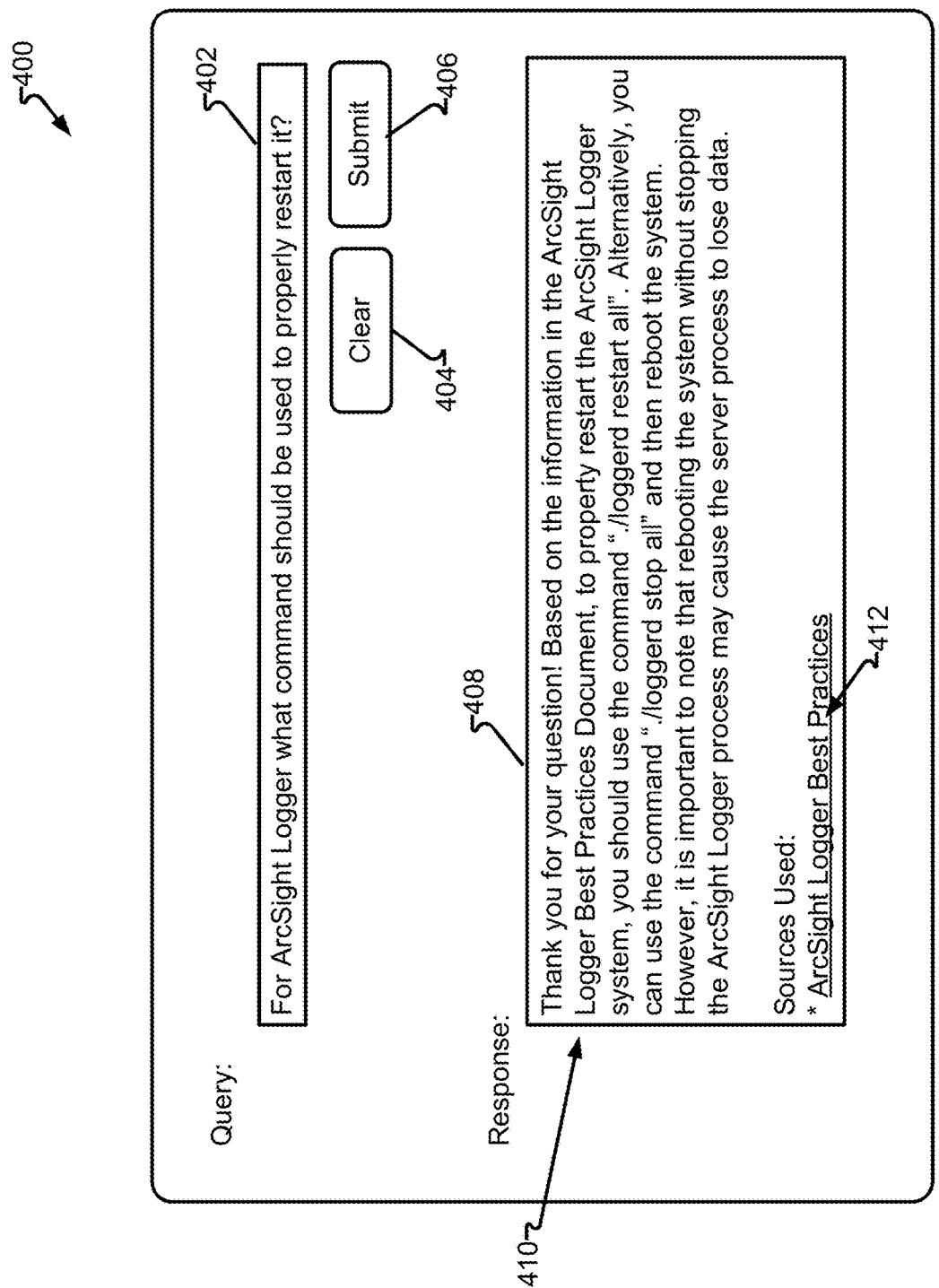
FIG. 4 depicts a display dialog in accordance with embodiments of the present disclosure.

FIG. 4 depicts display dialog 400 in accordance with embodiments of the present disclosure. Display dialog 400 may be a display generated by computer 104 and receiving input from user 102 via a human-machine input-output component. In one embodiment, display dialog 400 comprises query entry 402 to receive a query. Clear button 404 allows the content query entry 402 to be erased and submit button 406 submits the query entered in query entry 402 to become user query 302.

A result is then provided in response dialog 408. Response dialog 408 comprises an answer to the query entered in query entry 402 formatted to include human-friendly or conversational English (or another language). Additionally, citation 410 identifies the source that was utilized to provide the answer or identify one source wherein a representative answer may be found. Additionally, citation location 412 allows a location (e.g., hypertext, file name, etc.) to be included (visibly and/or as a link) to allow ready access to a source, or the source, of the answer. It should be appreciated that formatting of the text provided by response dialog 408 may vary, such as to incorporate citation location 412 into the text of response dialog 408.

Figure 5:
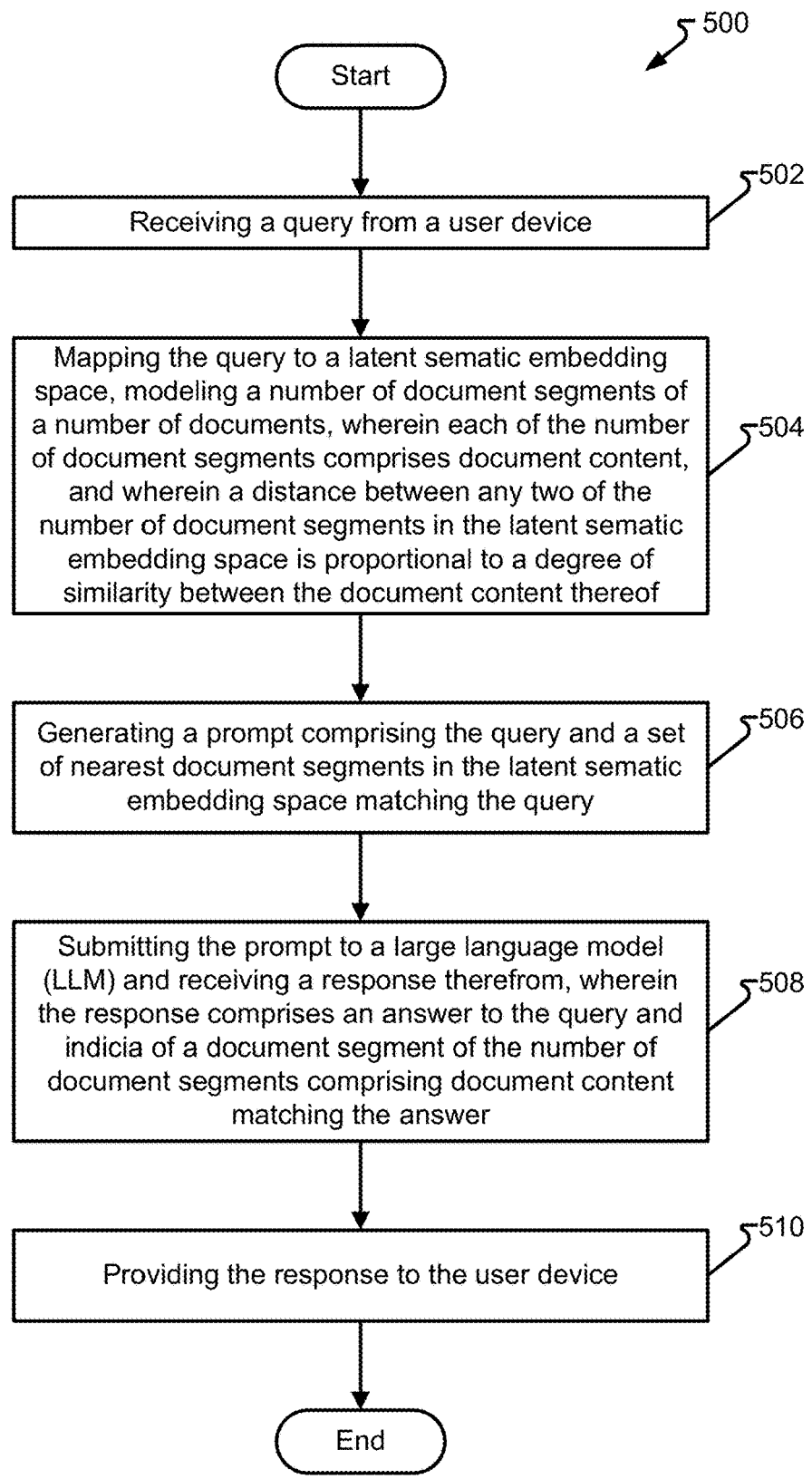
FIG. 5 depicts a process in accordance with embodiments of the present disclosure.

FIG. 5 depicts process 500 in accordance with embodiments of the present disclosure. In one embodiment, process 500 is embodied as machine-readable instructions maintained in a non-transitory memory that, when read by a machine, such as processors of a server, cause the machine to execute the instructions and thereby execute process 500. The processor of the server may include, but is not limited to, at least one processor of server 114, server 108, computer 104, etc.

Process 500 begins and, at step 502, a query is received by a user, such as a query entered into query entry 402 on computer 104 by user 102. In step 504, the query is mapped to latent semantic embedding space 208 comprising a number of segments, the segments comprising portions of a document segmented by topic and represented as points in latent semantic embedding space 208. Step 506 generates a prompt comprising the query and a set of nearest document segments to the topic. Step 508 submits the prompt to LLM 308 and receives a response therefrom. The response comprises indicia of a document segment of a document wherein the answer provided may be attributed. If no reasonably correct answer is determined, a response indicating an absence of an answer (e.g., "I don't know.") may be provided. The response is then provided 510 back to the user via computer 104 such as in response dialog 408 of display dialog 400.

Figure 6:
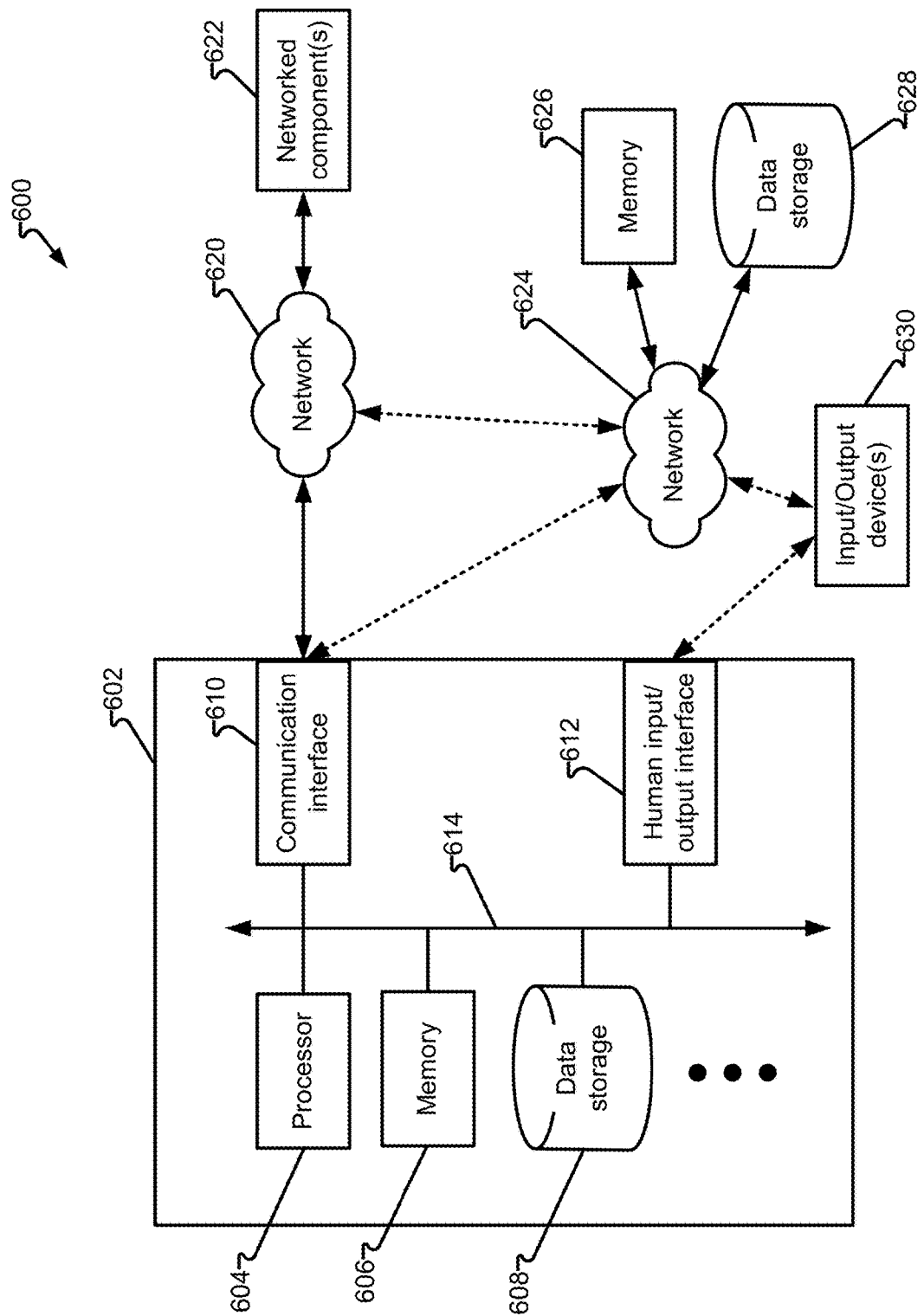
FIG. 6 depicts a system in accordance with embodiments of the present disclosure.

FIG. 6 depicts system 600 in accordance with embodiments of the present disclosure. In one embodiment, computer 104, server 108, and/or server 114 may be embodied, in whole or in part, as device 602 comprising various components and connections to other components and/or systems. The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may comprise programmable logic functionality, such as determined, at least in part, from accessing machine-readable instructions maintained in a non-transitory data storage, which may be embodied as circuitry, on-chip read-only memory, computer memory 606, data storage 608, etc., that cause the processor 604 to perform the steps of the instructions. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize computer memory 606 and/or data storage 608 for the storage of accessible data, such as instructions, values, etc. Network interface 610 facilitates communication with components, such as processor 604 via bus 614 with components not accessible via bus 614. Network interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, network interface 610 may comprise, or be comprised by, human input/output interface 612. Network interface 610 may be configured to communicate directly with a networked component or configured to utilize one or more networks, such as network 620 and/or network 624.

Network 106 may be embodied, in whole or in part, as network 620. Network 620 may be a wired network (e.g., Ethernet), wireless (e.g., WiFi, Bluetooth, cellular, etc.) network, or combination thereof and enable device 602 to communicate with networked component(s) 622. In other embodiments, network 620 may be embodied, in whole or in part, as a telephony network (e.g., public switched telephone network (PSTN), private branch exchange (PBX), cellular telephony network, etc.).

Additionally or alternatively, one or more other networks may be utilized. For example, network 624 may represent a second network, which may facilitate communication with components utilized by device 602. For example, network 624 may be an internal network to a business entity or other organization, whereby components are trusted (or at least more so) than networked components 622, which may be connected to network 620 comprising a public network (e.g., Internet) that may not be as trusted.

Components attached to network 624 may include computer memory 626, data storage 628, input/output device(s) 630, and/or other components that may be accessible to processor 604. For example, computer memory 626 and/or data storage 628 may supplement or supplant computer memory 606 and/or data storage 608 entirely or for a particular task or purpose. As another example, computer memory 626 and/or data storage 628 may be an external data repository (e.g., server farm, array, "cloud," etc.) and enable device 602, and/or other devices, to access data thereon. Similarly, input/output device(s) 630 may be accessed by processor 604 via human input/output interface 612 and/or via network interface 610 either directly, via network 624, via network 620 alone (not shown), or via networks 624 and 620. Each of computer memory 606, data storage 608, computer memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, a switch, a port, or other communication component such that a particular output of processor 604 enables (or disables) input/output device 630, which may be associated with network 620 and/or network 624, to allow (or disallow) communications between two or more nodes on network 620 and/or network 624. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method, comprising:
   receiving a query from a user device;
   mapping the query to a latent semantic embedding space;

modeling a number of document segments of a number of documents, wherein each of the number of document segments comprises document content, and wherein a distance between any two of the number of document segments in the latent semantic embedding space is proportional to a degree of similarity between the document content thereof;

generating a prompt comprising the query and a set of nearest document segments in the latent semantic embedding space matching the query;

submitting the prompt to a large language model (LLM) and receiving a response therefrom, wherein the response comprises an answer to the query and indicia of a document segment of the number of document segments comprising document content matching the answer;

providing the response to the user device;

wherein the document content of at least one document of the number of documents comprises table data, the table data comprising a number of cells having a cell value, the cell value being further associated with at least one of a column heading, a row heading, or a table heading of the table data; and segmenting the table data into at least one of the number of document segments comprises:

linearizing the table data to comprise a linearized cell value comprising the cell value, the column, and the heading; and segmenting at topic breakpoints between topics of the linearized table data.

2. The method of claim 1, further comprising formatting the response wherein the indicia of the document segment of the number of document segments comprising the document content matching the answer, comprises indicia of one of the number of documents comprising the document content matching the answer.

3. The method of claim 1, further comprising:

accessing a document corpus having the number of documents;

segmenting each document of the number of documents into the number of document segments, each document segment comprising the document content; and plotting each of the number of document segments into the latent semantic embedding space.

4. The method of claim 3, wherein segmenting each document of the number of documents into the number of document segments comprises, for at least one document of the number of documents, segmenting at formatting breakpoints of the document content.

5. The method of claim 3, wherein segmenting each document of the number of documents into the number of document segments comprises:

segmenting at topic breakpoints within the document content.

6. The method of claim 5, wherein determining the topic breakpoints within the document content comprises:

segmenting the document content into a first number of segments;

computing a number of tokens for each of the first number of segments, wherein each token of the number of tokens represents a single word of the document content;

accessing a context size of the LLM;

estimating a high threshold number of tokens from the context size of the LLM;

tokenizing the document content of a segment into a number of tokens; and upon determining the number of tokens is greater than the high threshold number of tokens, resegmenting the document content into a second number of segments that is greater than the first number of segments.

7. The method of claim 5, wherein determining the topic breakpoints within the document content comprises:

segmenting the document content into a first number of segments;

computing a number of tokens for each of the first number of segments, wherein each token of the number of tokens represents a single word of the document content;

accessing a context size of the LLM;

estimating a low threshold number of tokens from the context size of the LLM;

tokenizing the document content of a segment into a number of tokens; and upon determining the number of tokens is less than the low threshold number of tokens, resegmenting the document content into a second number of segments that is less than the first number of segments.

8. The method of claim 3, wherein:

the document content of at least one document of the number of documents comprises visual data; and the method further comprises extracting at least one textual description from metadata of the at least one document and segmenting the number of document segments of the at least one textual description.

9. The method of claim 3, wherein:

the document content of at least one document of the number of documents comprises visual data, the visual data further comprising a number of video frames; and the method further comprises extracting at least one textual description from metadata of the at least one of the number of video frames and segmenting the number of document segments of the at least one textual description.

10. The method of claim 9, wherein the metadata comprises digital images of text.

11. A system, comprising:

a server, comprising at least one microprocessor coupled to a computer memory storing machine-readable instructions therein;

the instructions causing the server to perform:

receiving a query from a user device;

mapping the query to a latent semantic embedding space, modeling a number of document segments of a number of documents, wherein each of the number of document segments comprises document content, and wherein a distance between any two of the number of document segments in the latent semantic embedding space is proportional to a degree of similarity between the document content thereof;

generating a prompt comprising the query and a set of nearest document segments in the latent semantic embedding space matching the query;

submitting the prompt to a large language model (LLM) and receiving a response therefrom, wherein the response comprises an answer to the query and indicia of a document segment of the number of document segments comprising document content matching the answer;

providing the response to the user device;

wherein the document content of at least one document of the number of documents comprises table data, the table data comprising a number of cells having a cell value, the cell value being further associated with at least one of a column heading, a row heading, or a table heading of the table data; and
segmenting the table data into at least one of the number of document segments, comprises:
linearizing the table data to comprise a linearized cell value comprising the cell value, the column, and the heading; and
segmenting at topic breakpoints between topics of the linearized table data.

12. The system of claim 11, further comprising formatting the response, wherein the indicia of the document segment of the number of document segments comprising the document content matching the answer, comprises indicia of one of the number of documents comprising the document content matching the answer.

13. The system of claim 11, further comprising:
accessing a document corpus having the number of documents;
segmenting each document of the number of documents into the number of document segments, each document segment comprising the document content; and
plotting each of the number of document segments into the latent semantic embedding space.

14. The system of claim 13, wherein segmenting each document of the number of documents into the number of document segments comprises, for at least one document of the number of documents, segmenting at formatting breakpoints of the document content.

15. The system of claim 13, wherein segmenting each document of the number of documents into the number of document segments comprises:
segmenting at topic breakpoints within the document content;
determining the topic breakpoints within the document content, further comprising:
segmenting the document content into a first number of segments;
computing a number of tokens for each of the first number of segments, wherein each token of the number of tokens represents a single word of the document content;
accessing a context size of the LLM;
estimating a high threshold number of tokens from the context size of the LLM;
tokenizing the document content of a segment into a number of tokens; and
upon determining the number of tokens is greater than the high threshold number of tokens, resegmenting the document content into a second number of segments that is greater than the first number of segments.

16. The system of claim 15, wherein determining the topic breakpoints within the document content comprises:
segmenting the document content into a first number of segments;
computing a number of tokens for each of the first number of segments, wherein each token of the number of tokens represents a single word of the document content;
accessing a context size of the LLM;
estimating a low threshold number of tokens from the context size of the LLM;
tokenizing the document content of a segment into a number of tokens; and
upon determining the number of tokens is less than the low threshold number of tokens, resegmenting the document content into a second number of segments that is less than the first number of segments.

17. The system of claim 13, wherein:
the document content of at least one document of the number of documents comprises visual data; and
the instructions further causing the server to perform extracting at least one textual description from metadata of the at least one document and textual description from metadata of the at least one of a number of video frames and segmenting the number of document segments of the at least one textual description.

18. A system, comprising:
a server, comprising at least one microprocessor coupled to a computer memory storing machine-readable instructions therein; and
a data storage comprising a latent semantic embedding space, modeling a number of document segments of a number of documents; and
wherein the instructions cause the server to perform:
receiving a query from a user device;
mapping the query to the latent semantic embedding space, modeling a number of document segments of a number of documents, wherein each of the number of document segments comprises document content, and wherein a distance between any two of the number of document segments in the latent semantic embedding space is proportional to a degree of similarity between the document content thereof;
generating a prompt comprising the query and a set of nearest document segments in the latent semantic embedding space matching the query;
submitting the prompt to a large language model (LLM) and receiving a response therefrom, wherein the response comprises an answer to the query and indicia of a document segment of the number of document segments comprising document content matching the answer;
providing the response to the user device;
wherein the document content of at least one document of the number of documents comprises table data, the table data comprising a number of cells having a cell value, the cell value being further associated with at least one of a column heading, a row heading, or a table heading of the table data; and
segmenting the table data into at least one of the number of document segments, comprises:
linearizing the table data to comprise a linearized cell value comprising the cell value, the column, and the heading; and
segmenting at topic breakpoints between topics of the linearized table data.

19. The system of claim 18, further comprising formatting the response, wherein the indicia of the document segment of the number of document segments comprising the document content matching the answer, comprises indicia of one of the number of documents comprising the document content matching the answer.

20. The system of claim 18, further comprising:
accessing a document corpus having the number of documents;
segmenting each document of the number of documents into the number of document segments, each document segment comprising the document content; and
plotting each of the number of document segments into the latent semantic embedding space.

* * * * *